(12) United States Patent
Radisek et al.

(10) Patent No.: US 8,562,481 B2
(45) Date of Patent: Oct. 22, 2013

(54) GEARING WITH CYLINDRICAL TOOTH FORMS

(75) Inventors: Theodore Radisek, Aurora, OH (US); Merritt A. Osborn, Chagrin Falls, OH (US)

(73) Assignee: Kiss Engineering, LLC, Solon, OH (US)

(*) Notice: Subject to any disclaimer, the term of this patent is extended or adjusted under 35 U.S.C. 154(b) by 158 days.

(21) Appl. No.: 13/234,772

(22) Filed: Sep. 16, 2011
(Under 37 CFR 1.47)

(65) Prior Publication Data

US 2012/0208668 A1     Aug. 16, 2012

Related U.S. Application Data

(63) Continuation-in-part of application No. 12/884,660, filed on Sep. 17, 2010, now Pat. No. 8,328,677.

(60) Provisional application No. 61/243,691, filed on Sep. 18, 2009, provisional application No. 61/323,916, filed on Apr. 14, 2010.

(51) Int. Cl.
*F16H 57/08* (2006.01)

(52) U.S. Cl.
USPC ......................................................... 475/344

(58) Field of Classification Search
USPC .................................................. 475/182, 344
See application file for complete search history.

(56) References Cited

U.S. PATENT DOCUMENTS

| | | | | |
|---|---|---|---|---|
| 5,456,638 | A * | 10/1995 | Osborn | 474/155 |
| 7,591,746 | B2 * | 9/2009 | Tarnopolsky et al. | 474/155 |
| 8,402,659 | B2 * | 3/2013 | Kotthoff | 29/893.32 |
| 2006/0035739 | A1 * | 2/2006 | Osborn et al. | 474/155 |

* cited by examiner

*Primary Examiner* — Edwin A Young
(74) *Attorney, Agent, or Firm* — Patrick J. Daugherty; Driggs, Hogg, Daugherty & Del Zoppo Co., LPA

(57) ABSTRACT

Embodiments provide for planetary gearing systems with sun, planetary and ring gears, wherein the ring gears have generally cylindrical or elliptical tooth forms with a common shape and geometric parameters. The ring gear and a sun gear each engage one or more of planetary gears in respective mesh engagements, wherein the gear forms on each may be independently formed as a function of their respective geometries (sun or ring gear pitches, and sun or ring radii from a common central axis of the planetary gearing system), and as a function of the planetary gear tooth form shape and geometric parameters, planetary gear radius from the common central axis, and the planetary gear tooth pitch.

17 Claims, 10 Drawing Sheets

GEARING WITH CYLINDRICAL TOOTH FORMS

CROSS-REFERENCE TO RELATED APPLICATIONS

This application is a continuation-in-part of, and claims the priority benefits of, pending U.S. patent application Ser. No. 12/884,660, filed Sep. 17, 2010, Confirmation No. 7146, which claims priority benefits of the following provisional patent applications previously filed in the United States Patent and Trademark Office by common inventors Merritt A. Osborn and Theodore Radisek: "BALANCED SUN AND RING GEAR FORMS FOR PLANETARY GEARING," filed Sep. 18, 2009, Ser. No. 61/243,691, Confirmation No. 4357; and "ROBUST TOOTH FORM GEARING SYSTEM," filed Apr. 14, 2010, Ser. No. 61/323,916, Confirmation No. 7640.

BACKGROUND

One gearing structure that provides superior common normal, rolling contact and low friction attributes during force transfer is a sprocket and roller system, wherein solid sprocket gear teeth engage roller elements (e.g. on a roller chain, or a plurality of rollers arrayed and attached to another gear element such as a disc, cylinder, etc.). Such systems have many economic and design advantages. Frictional problems are minimized by the rolling interaction of rollers with respect to interfacing sprocket gear teeth, and many lubrication options are possible. A well known chain and sprocket system for variable speed reduction and torque transmission is a bicycle "derailleur" system, where speed and torque outputs are chosen by selecting from a group of input and output sprocket gears sharing a common chain.

In the interaction of gear elements driven by gear teeth in speed reduction and torque transmission, it is desirable to have a common normal orientation of the respective contacting surfaces intersecting a line of centers at all times, a fundamental principle sometimes known as the "common normal" principle. Gear profiles that do not satisfy this principle may not have a constant angular velocity ratio. A driving first gear may revolve at a constant rate (RPM), but a failure to maintain the common normal during the entire interaction with a driven gear contact element results in varying output revolution rate and torque transmission behavior. The driven gear may speed up and slow down instead of rotating smoothly and constantly responsive to a constant rotational input of the first gear.

Planetary power transmission composite gear structures are known for torque and speed reduction and increasing applications. Rotation of a circular "sun" gear about its central axis with rotation speed and torque engages one more "planetary" gearing element(s) disposed about the sun gear, wherein if more than one planetary gear is provided, said planetary gears are generally arrayed about the sun gear central axis. The planetary gears in turn responsively engage a "ring" gear disposed about the sun gear and the planetary gears generally arrayed about the sun gear central axis. In application, a rotational motion input through one of the ring gear and sun gear elements is translated through the planetary gearing element(s) into a rotational motion output by the other of the sun and ring gears at either an increased speed and reduced torque or a reduced speed and increased torque output.

The performance capabilities of sprocket-and-roller planetary systems may be limited relative to other systems, such as meshed fixed tooth systems. In one aspect, the overall strength, force bearing or force transmission capacity of a prior art sprocket-and-roller planetary system may be lower than comparably sized meshed fixed tooth systems.

BRIEF SUMMARY

One embodiment of present invention, a planetary gearing system, has a ring gear of tooth forms arrayed in a ring gear pitch on a ring gear radius from a central axis, each having common ring gear shape and tooth form geometric parameters. At least one planetary gear is encompassed by the ring gear and has tooth forms arrayed outward along a planetary gear radius from a central planetary gear axis in a planetary gear tooth pitch and having a common tooth form gear shape and geometric parameters, the planetary gear positioned for its tooth forms to operatively engage the ring gear tooth forms. A sun driver is encompassed by the ring gear and has tooth forms arrayed in a sun gear pitch and a sun gear radius from the central axis less than the ring gear radius, each having a common sun gear tooth form shape and geometric parameters and positioned to operatively engage the planetary tooth forms. More particularly, the sun gear tooth form shape and geometric parameters are defined as a function of the planetary gear tooth form shape and geometric parameters, the planetary gear radius and the planetary gear tooth pitch, to form the mesh engagement with the planetary gear tooth forms when aligned for engagement with the sun gear at a contact radius from the central axis. Similarly, and independently, the ring gear tooth form shape and geometry are defined as a function of the planetary gear tooth form shape and geometry, the planetary gear radius and the planetary gear tooth pitch to form the mesh engagement with the planetary gear tooth forms when aligned for engagement at a ring gear contact radius from the central axis.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
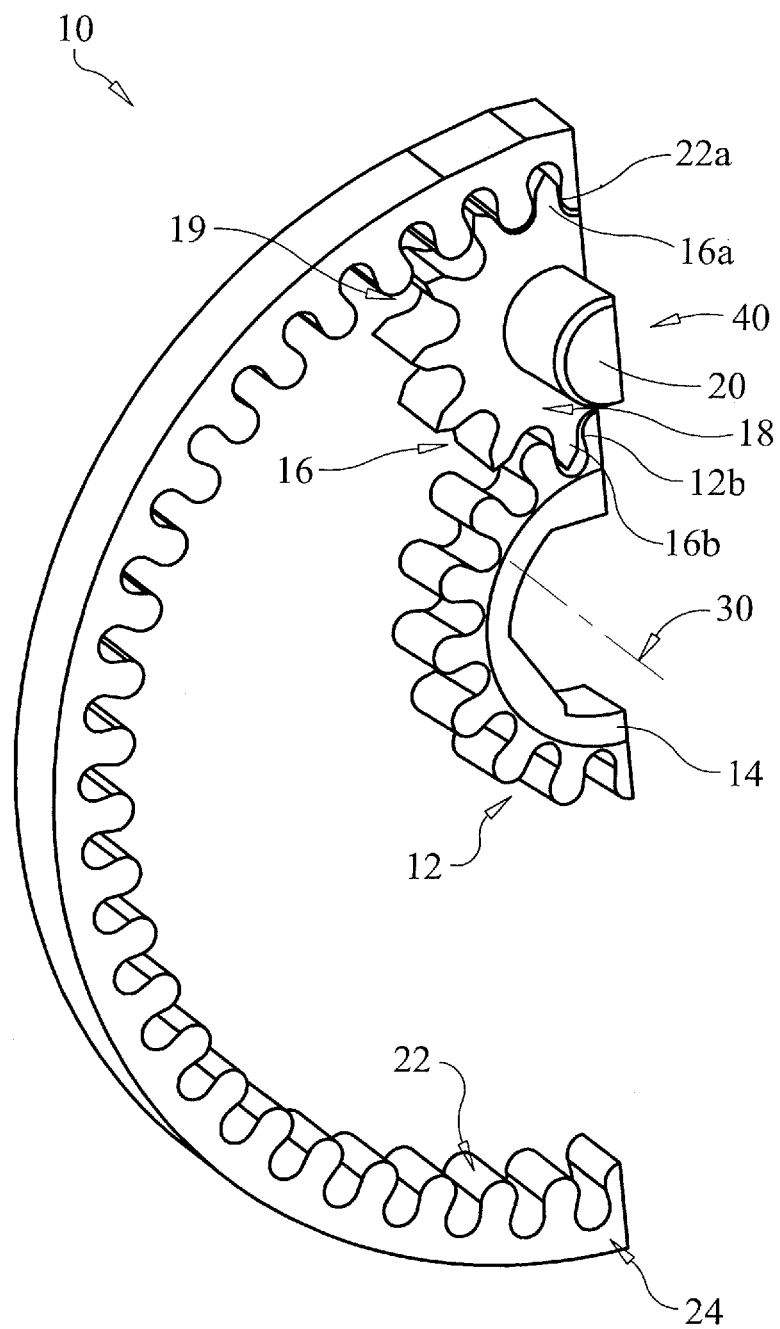
FIG. 1 is a perspective illustration view of an embodiment of a gearing system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In a sprocket-and-roller planetary system, appropriate system geometries in sprocket size and roller engagement are limiting. Generally, a minimum number of rollers should be fully engaged with sprocket teeth during driving operations to maintain a constant speed and rotate smoothly with respect to the sprocket. For example, in many applications, a roller chain should wrap around and fully engage at least about one-third of engaged sprocket teeth, which in turn requires that the alignment of the roller chain with the sprocket gear should define about a 120 degree angle between the chain ends about the gear. If such an alignment and engagement are not met, then a roller chain may exhibit cordal action, where relational velocities are no longer equal and the chain will start bouncing, and speed reduction and torque transfer properties of the engagement break down.

Figure 2A:
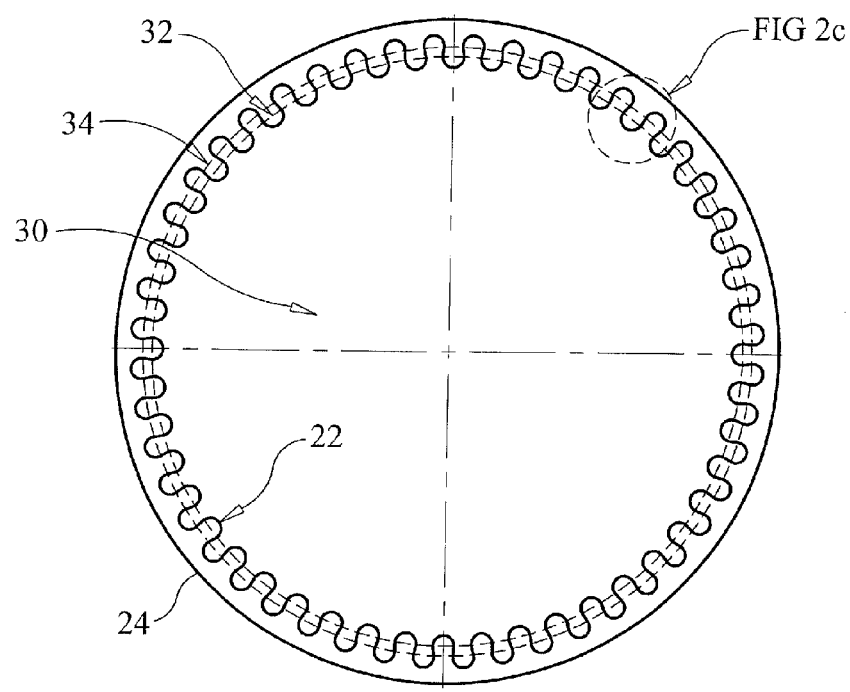
FIG. 2*a* is a side view illustration of a component of the gearing system of FIG. 1.
Figure 2B:
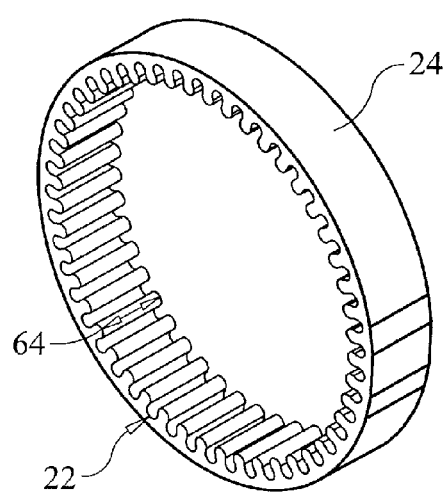
FIG. 2*b* is a perspective view illustration of the component of FIG. 2A.
Figure 2C:
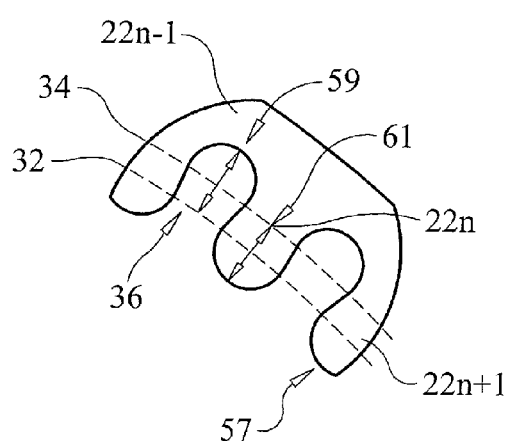
FIG. 2*c* is a detail view illustration of the component of FIG. 2A.
Figure 3A:
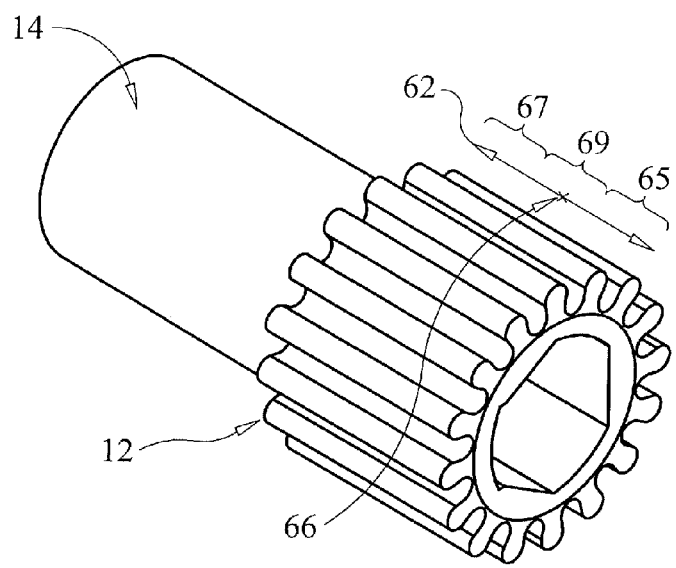
FIG. 3*a* is a perspective view illustration of a component of the gearing system of FIG. 1.
Figure 3B:
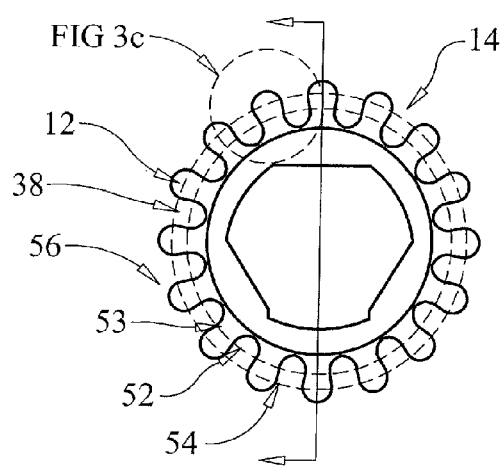
FIG. 3*b* is a side view illustration of the component of FIG. 3A.
Figure 3C:
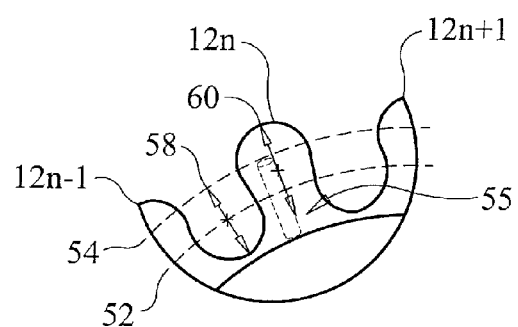
FIG. 3*c* is a detail view illustration of the component of FIG. 3A.

FIG. 1 illustrates a perspective sectional view of a portion of a planetary gearing system 10 according to the present invention, comprising a ring gear 24, at least one planetary sprocket gear 18 and a sun gear 14; for clarity of illustration, some elements of the system are omitted, such as bearings, input and output housings and elements, etc., but the application of such omitted elements will be readily apparent to one skilled in the art. FIGS. 2a-2c provide additional views of the ring gear 24, and FIGS. 3a-3c provide additional views of the sun gear 14. The ring gear 24 comprises a first plurality of cylindrical tooth forms 22 arrayed in a ring gear 24 pitch (the number of tooth forms within a given dimensional length, of the total number of forms on the respective gear), wherein the pitch is here defined with respect to expected engagement of the sprocket gear tooth forms 19 on the planetary sprocket gear 18. The present embodiment defines the ring gear 24 pitch with respect to ring/sprocket gear engagement radii 32 and 34 from a central axis 30, as is more fully described below.

The planetary sprocket(s) 18 is/are encompassed by the ring gear 24 and located about a central planetary pin 20 and comprises a plurality of sprocket teeth 16 arrayed outward along a common radius from a central axis 40 common to the sprocket 18 and the cylindrical planetary pin 20. In some embodiments, the planetary sprocket teeth 16 are generally configured to drive a rotational output of the sun gear 14 about the central axis 30 at an increased output speed and decreased torque relative to an input speed and torque of the planetary pin 20 about the central axis 30, as a result of the planetary sprocket teeth 16 engaging the ring gear tooth forms 22. In another application, the planetary sprocket teeth 16 are generally configured to drive a rotational output of the planetary pin 20 about the central axis 30 at a decreased output speed and increased torque relative to an input speed and torque of the sun gear 14 about the central axis 30, again as a result of the planetary sprocket teeth 16 engaging the ring gear tooth forms 22. Alternative embodiments may provide for different driving and driven elements of the respective gearing elements 14, 18, 20 and 24 as will be appreciated by one skilled in the art.

Forming and aligning the sprocket(s) 18, ring gear 24 and sun gear 14 into a generally conjugate engagement during their rotational interaction may improve gearing system 10 performance, for example by minimizing sliding and rubbing action during force and speed transmission and thus improving operating efficiencies. Conjugate gear alignment may also produce a uniform velocity ratio; when an input gear device rotates at a constant speed, the mating output gear will also rotate at a constant speed. Thus, it may be desirable for a planetary sprocket tooth shape to correspond to sun or ring gear rollers in order to maintain the common normal at the contacting surfaces, the tooth shape correlating to the sun and ring gear rollers responsive to the nature and duration of their contact. Accordingly, in some embodiments, the sprocket(s) 18, ring gear 24 and sun gear 14 are aligned into a generally conjugate engagement along either or both of the deeper ring/sprocket gear engagement radius 34 from a central axis 30 and the sun/sprocket gear engagement radius 52 from the central axis 30.

The planetary sprocket teeth 16 may have an involute curve tooth shape appropriate for engaging at least one of the sun gear tooth forms 12 and the ring gear tooth forms 22. An appropriate involute tooth form for a given roller gear may be defined by a string projecting from the edge of a circle defined by the cross-section of the cylindrical at least one sun gear tooth form 12/ring gear tooth form 22 as unwinding from the circle, wherein a portion of the line between the end projecting from the circle and a point along the circle intersected by a radius of the circle parallel to the line end will trace out an involute curve, as will be apparent to one skilled in the arts. Conventional conjugate involute sprocket gear tooth shapes are known; for example, American National Standards Institute (ANSI), American Standards Association (ASA) and American Gear Manufacturers Association (AGMA) standards provide for selecting involute gear tooth forms responsive to the gear size and interaction parameters. Accordingly, in order to ensure conjugate gear alignment, and/or that minimum numbers of circular cross-section sun or ring gears are fully engaged with sprocket teeth during driving operations, the planetary system 10 may be constructed for a speed and torque reducer or increaser application by selecting roller gear sun and ring gear forms 14/24 with a common circular cross-section diameter 60/61 and on pitches selected to conform to specified, respective planetary sprocket gear involute forms 16. For example, ASA B.291-1963 provides for the selection of sprocket tooth forms 16 in response to pitch, number of sprocket teeth and roller chain roller diameters where roller chains are used for ring or sun gears.

Accordingly, in some embodiments of the present invention, a common involute gear shape is selected for the sprocket teeth 16 to optimize conjugate or other engagement of at least one of the ring gear tooth forms 22 and the sun gear tooth forms 12. In the embodiment illustrated in FIGS. 1, 2a-2c and 3a-3c, solid metal cylindrical tooth forms are used for the ring gear tooth forms 22 and the sun gear tooth forms 12, respectively, with outer engagement surfaces 56 and 57 that may be hardened. Thus, as illustrated in FIG. 3c, the sun gear tooth forms 12 present outer engagement surfaces 56 defined along cylindrical diameters 60. As the tooth form 12n outer surface 56 transitions to each adjacent tooth forms 12n+1 and 12n−1, it defines a required sun tooth gullet 38 along a sun tooth gullet diameter 58 generally in common with the tooth form 12n outer engagement surface cylindrical diameter 60. The gullets in these diagrams have been simplified to circular form for simplicity in illustration. Similarly, as illustrated in FIG. 2c, the ring gear tooth forms 22n may present outer engagement surfaces 57 defined along cylindrical diameters 61 and which transition to each adjacent tooth form 22n+1 and 22n−1 by defining a ring tooth gullet 36 along a ring tooth gullet diameter 59 generally in common with the tooth form 22n outer engagement surface cylindrical diameter 61. Again, the gullets in these diagrams have been simplified to circular form for simplicity in illustration.

The tooth form diameters 58, 59, 60 and 61 may thus be selected and arrayed with respect to the central axis 30 of the gearing system 10 to ensure conjugate gear contact alignment with the involute sprocket teeth 16 in order to produce uniform velocity ratio, wherein when an input gear device rotates at a constant speed, the mating output gear will also rotate at a constant speed. This alignment also generally enhances force engagement and transfer relative to non-conjugate alignment (for example, shallower engagements such as those provided by either or both of the ring/sprocket gear engagement radius 32 from a central axis 30 and the sun/sprocket gear engagement radius 54 from the central axis 30). However, in another aspect of the present invention, the depth of engagement of the sprocket teeth 16 with either of the ring gear tooth forms 22 and the sun gear tooth forms 12 may be varied or otherwise selected as a function of providing alternative operation characteristics.

For example, moving the alignment of the engagement of the planetary teeth 16 into a shallower penetration of the sprocket tooth form gullets 19 at either ring/sprocket gear engagement radii 32 or 54, and thus into a less conjugate engagement with the cylindrical ring or sun gear tooth forms 22, 12, may reduce chatter, noise and vibration in the operation of a planetary gearing system 10 but still provide robust operational strength by the gearing system 10. This may be beneficial with respect to speed increasing applications, and in particular providing for quieter and smoother performance.

Nu Lobe™ Solid Lobe Gears

In one aspect, operative strength and operational life of the gearing system 10 is enhanced by utilizing solid metallic cylindrical structures for the ring and sun gear tooth forms 22, 12, compared to conventional roller chain and other roller forms, and in particular where the shallower contact radii 54, 32 are selected (e.g. for quieter operations and less vibrations relative to the deeper radii 52, 34). It will be understood that the adjective "solid" as used with respect to the ring and sun gear tooth forms 22, 12 denotes a contiguous construction with the rest of the body forming the respective ring or sun gears 24, 14. More particularly, Nu Lobe™ and other solid cylindrical ring and sun gear tooth forms 22, 12 according to the present invention may comprise hollow lobes wherein a central hole or aperture 55 is defined within either of the lobe forms 22, 12. (NU LOBE is a trademark of Gearing Solutions, Inc. in the United States or other countries.) Hollow lobe form 22, 12 embodiments have been found to provide improvements in strength of about eight times over the strength of roller gears of similar outer surface dimensions, thus providing for corresponding increases in durability and service life. Hollow lobe form 22, 12 embodiments also provide for an increase in strength, durability and service life relative to solid, continuous forms without central holes or apertures.

More particularly, wherein roller gears may spread forces to stress points over a broad concave area, solid gear forms instead have major stress points in the corners of their gullets, for example the forces generally concentrated at corners 53 at the base of each solid, lobed tooth 12. The geometry of hollow lobe forms 22, 12 allows said forces concentrated at the gullet corners to be translated into vectors better supported by the walls of the hollow lobe form over the contiguous material in continuous-formed solid gears without apertures/holes. Testing of embodiments of hollow lobe forms 22, 12 according to the present invention has found them about 9% stronger than continuous-formed solid gears without apertures/holes of similar metal material, with failure occurring by material cracking, not at the gullet base 53 but at outer tip areas of the globular outer surface 56. In another aspect, conventional continuous-formed solid gears without apertures/holes may be aligned to engage sprocket teeth in a cantilevered arrangement with their base structures in order to enhance their overall strength; the hollow gullet stalk form of the present invention provides similar same or greater strength enhancement, and thus there is no need to provide for cantilevering in gear formation or alignment.

In another aspect of the present invention, providing solid lobe ring and sun gear forms 22, 12 enables extension of the length of the sprocket gear teeth 16 relative to conventional gearing arrangements. The solid lobe shape allows the gullets 38 to be deeper for deeper sprocket involute tooth 16 penetrations and thus a corresponding larger surface area engagement of the outer lobe surface 56, relative to rollers. Limits on possible gullet depth penetration for engagement of roller gear forms typically limits the contact ratio to a maximum of 1.7, wherein the solid lobe gear forms 22, 12 according to the present invention enable larger contact ratios, in one embodiment of 2.4. Furthermore, extending the length of the sprocket gear teeth to take advantage of the deeper gullet 38 penetration also provides for a logarithmic increase in sprocket tooth 16 strength: in one example, a 10% longer sprocket tooth 16 may have 25%-30% greater strength over a smaller tooth 16 of similar involute shape and metal material formation.

Relative Pitch Count Variations

Referring again to FIG. 1, as a planetary gear tooth 16b forcibly engages a sun gear tooth form 12b, another planetary gear tooth 16a on the opposite side of the planetary gear forcibly engages a ring gear tooth form 22a, with operative loads generally spread evenly between the teeth/form 16a-22a and 16b-12b interactions. This means that if one of the teeth/form engagements 16a-22a and 16b-12b is structurally weaker than the other, the weaker one will establish a tolerance or limit of the overall capability of the planetary gearing system 10. If cylindrical gear forms with a common diameter are used for the ring and sun gears 24 and 14, which is generally required to ensure a desired conjugate or shallow engagement with the sprocket teeth 16 by each of the ring and sun gears 24, 14, the sun gear 14 will be the weaker gear due to a lower total pitch count relative to the ring gear 24. This may be due to the greater total force or duration of force applications withstood by the each of the lower number of sun gear tooth forms 12 relative to the ring gear tooth forms 22 during speed and torque transformation operations. Thus, a lower-pitch count sun gear 14 may limit the strength and capacity of an entire prior art gear set below the capabilities of a stronger ring gear tooth/form 16a-22a interface.

Gear Form Body Length Variations

In some embodiments of the present invention, the cylindrical sun gear tooth forms 12 have a different, longer body length 62 relative to a body length 64 of the ring gear cylindrical gear forms 22, which has been to increase the operational strength of the sun gear 14 to at least that of the ring gear 24 and remove or reduce for any inherent relative weakness due to decreased total pitch count of the sun gear 14 relative to the ring gear 24. This also enables the selection of a planetary sprocket gear involute tooth form 16 having a conjugate gear alignment with both of the sun and ring gear tooth forms 12, 22, for example where the respective ring and sun gear tooth form cylindrical diameters 60, 61 are common, or are relatively closer in value compared to a difference between the respective body lengths 62, 64.

Some embodiments achieve sun gear 14 strengthening relative to the ring gear 24 by providing for sun gear tooth form body lengths 62 at least about 150% of the ring gear tooth form length 64 when the respective tooth form cylindrical diameters 60, 61 are generally equivalent, and wherein the planetary sprocket teeth 16 are generally aligned to engage the sun gear cylindrical tooth forms 12 about the center points 66 of the body length 64. Exterior portions 65 and 67 each representing about 25% of the body length 64 extend on opposite sides of a central planetary sprocket gear tooth engaging portion 69 of the sun gear tooth form 12, the exterior portions 65 and 67 not engaging the planetary sprocket gear teeth 16 during operation of the gear set.

The present invention is not limited to the examples described herein. Other embodiments may choose alternative value differentials with respect to the body length 62, 64 and/or tooth form cylindrical diameters 60, 61. The engagement points along the sun and ring gear forms 12 and 22 may also vary; for example, engagement along a relatively longer sun gear form 12 may not be centered relative to the body length 62 but may be offset from the center point 66 or aligned to engage one of the end portions 65 or 67.

Roller and Pin Assemblies

Figure 4:
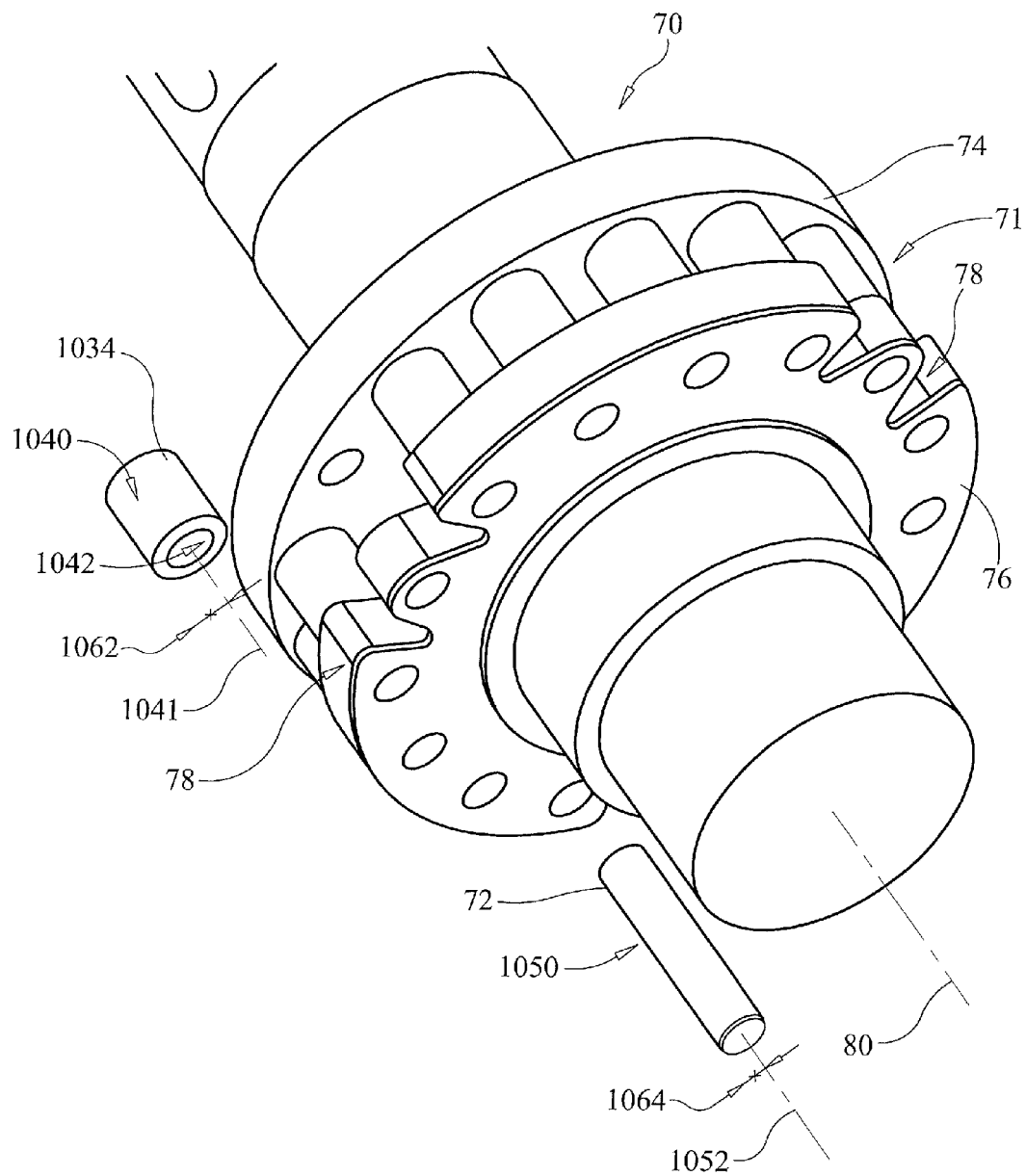
FIG. 4 is a perspective view illustration of gearing system components according to the present invention.

FIG. 4 illustrates another sun gear 70 according to the present invention having rollers 71 disposed about pins 72 fixed at either end into opposing plate members 74 and 76. Exemplary pin and roller gears are taught by U.S. Pat. No. 4,077,273 to Osborn, the entire disclosure of which is hereby incorporated. The embodiment shown in FIG. 4 also illustrates a sun gear assembly 70 machined in such fashion as to allow a plurality of sprockets (for example, three, though other pluralities may be practiced) to be assembled in an axial direction. More particularly, tooth shaped cut outs 78 formed in an opposing plate member 76 allow sprocket teeth clearance during assembly, which allows the sprockets to be pre-assembled onto their respective drive pins and carriage prior to axial engagement with the drive train's sun gear 70 and then slid into engagement in an axial direction (generally along the central driver axis 80) as will be readily appreciated by one skilled in the art. Although the present embodiment is a sun driver 70, other embodiments may be ring gears (not shown) wherein the tooth shaped cut outs formed in an opposing plate member also allow sprocket teeth clearance during assembly, wherein sprockets may be pre-assembled onto their respective drive pins and carriage prior to axial engagement with said ring gear and then slid into engagement therewith in an axial direction. Thus, a configuration and method of assembly wherein tooth shaped cut outs are formed in an opposing plate member of a sun or ring gear has been found to be beneficial in allowing simplification of the overall assembly method and process.

The use of roller chains for the sun gear form 12 or ring gear tooth forms 22 or 71 may provide for lubrication methods which enable a resultant gearing assembly to be an "uncased" assembly. More particularly, roller chains may be impregnated with their own lubricant as is well known in the art, which may remove requirements to encase an assembly in order to contain lubricants, such as gear oils. This may allow for substantial reduction in the cost of manufacturing, resulting in greatly increased production efficiencies over encased gear sets.

Alternative roller pin sun gear forms 12 or ring gear tooth forms 22 or 71 may also be provided. For example, it has been found that roller and pin assemblies may provide for improved operation lifetimes, and also for quieter operations in high-speed multi-stage speed reducer gearing applications, compared to roller chain assemblies. Accordingly, one embodiment of the sun gear roller form 71 of FIG. 4 may comprise cylindrical rollers 1034 disposed about and spaced from cylindrical pins 72 fixed at either end into the opposing plate members 74 and 76. It will also be understood that the roller 1034/pin 72 assemblies may also be used for gearing forms for the sun gear form 12 or the ring gear tooth form 22 in gear sets according to the present invention.

The cylindrical rollers 1034 have hardened and highly polished outer cylindrical surfaces 1040 defined from a roller body central axis 1041, and inner, softer interior cylindrical surface body 1042 also defined from the roller body central axis 1041. In assembly on the driver 70, the roller interior cylindrical surface 1042 is disposed about and spaced from a hardened and highly polished outer cylindrical pin surface 1050 defined from a pin body central axis 1052, wherein the central pin axes 1052 are generally aligned with the respective roller body central axes 1041 in said driver assembly 70.

The pins 72 may be formed from solid or tubing stock that is drawn and hardened, the outer cylindrical pin surfaces 1050 then highly polished, as will be understood by one skilled in the art. The rollers 1034 may be formed from low carbon seam tubing or other tubing material that is drawn and wherein the outer roller surface 1040 is hardened but the interior roller surface 1042 remains relatively softer and more readily accepting of a lubricant. In other embodiments, the roller 1034 has an outer roller surface 1040 formed from low carbon seam tubing or other tubing material that is drawn and hardened and polished, and a separate interior roller body 1042 is formed from drawn tubing but left unhardened, the interior surface of the separate interior roller body 1042 remaining relatively softer than the hardened outer body surface 1040. In some embodiments, there is a ten (10) point differential in hardness between the outer roller surface 1040 and the interior roller surface 1042. This hardness differential between the outer roller surface 1040 and the interior roller surface 1042 allows the interior surface to engage the hardened pin surface 1050 while also retaining lubrication more readily than the hardened surfaces 1040 and 1050, thus providing bushing-like lubrication functions.

The soft interior roller surface/body 1042 is defined on a roller interior surface radius 1062 from the roller central axis 1041. The hardened, polished outer pin surface 1050 is defined on a pin surface radius 1064 from the pin central axis 1052 which is smaller than the roller interior surface radius 1062, assuring a clearance between the pin outer surface 1050 and the roller interior surface/body 1042. In some embodiments, the differences between the pin surface radius 1064 and the roller interior surface radius 1062 range between about two to about four thousands of an inch. Said clearances have been found to provide for application of one or more lubricants to the interior roller surfaces/bodies 1042 sufficient to allow the rollers 1034 to freely rotate about the pins 72 in a gear set application (i.e. in engaging sprocket teeth under operative loading) and allow the omission of bushings there between. Thus, the roller 1034/pin 72 assembly according to the present invention provides for quiet operations in high speed applications with a longer service life than the conventional roller chain.

Bushings are typically required in conventional pin/roller and roller chain assemblies, for example in roller chain assemblies, to provide smooth rotation of the roller about the pin during operative engagement of other gears and reduce frictional wear on the rollers and their engaged sprocket tooth surfaces, thereby extending the operational life of each of the roller and engaged tooth elements. But as they are structurally softer or otherwise less robust than hardened roller and engaged tooth surfaces, they are commonly the point of failure during the operational life of conventional roller gear assemblies, wearing out and requiring replacement of the roller chain or other pin/roller assembly. By obviating the need for a bushing between the outer roller 1034 and central pin 72, wherein the interior roller surface/body 1042 is relatively softer and more retentive of lubricants than the hardened outer roller surfaces 1040 and highly polished outer cylindrical pin surfaces 1050, yet still more structurally robust than a typically soft bushing when it may be structurally incorporated as part of the stronger, drawn and hardened tube stock used to form the rollers 1034, the present invention provides for gear sets having longer operational lives compared to those conventional gear sets that require bushings.

Fixed and Rotating Solid Roller Assemblies

Figure 11A:
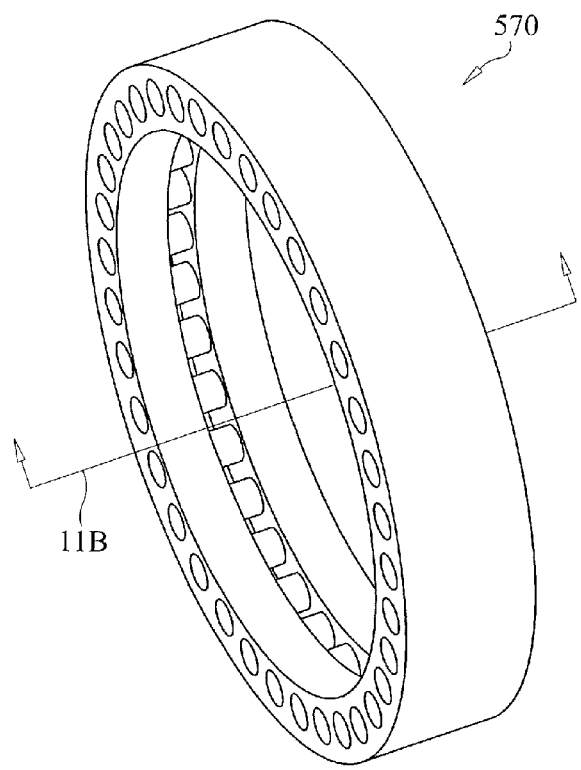
FIG. 11A is a perspective view illustration of gearing system components according to the present invention.
Figure 11B:
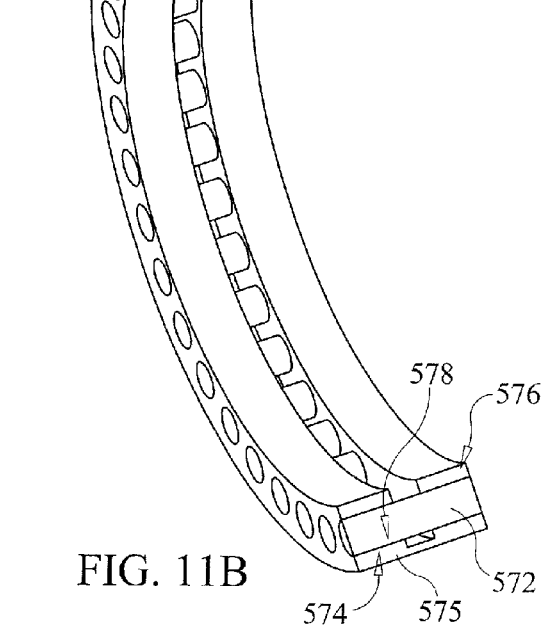
FIG. 11B is a sectional view of the gearing system components of FIG. 11A.

FIGS. 11A and 11B illustrate another ring gear 570 embodiment according to the present invention having solid pins 572 fixed or rotationally attached at either end into opposing plate portions 574 and 576 or a unitary ring gear body 575. The solid pins 572 may offer greater structural strength than roller chain assemblies providing rollers having a similar outer diameter. In one aspect, the length of the pins may be greater than that commonly available in roller chains, for example 1.5 times greater. It will also be appreciated that hollow tubes may be used for the pins 572 in other embodiments of the present invention.

The pins 575 may be deployed within apertures 578 formed in the opposing plate portions 574 and 576 for use with pins 575. In some embodiments, the inner surfaces of the apertures 578 are cylindrical and formed on diameters 580 that are greater than the diameters 582 of the outer cylindrical surfaces of the pins 572. The difference may be small enough to form a friction fit with the pins 572 and thereby hold them in place; for example, less than 1.5 thousands of an inch difference may provide for friction fit assemblies with the respective cylindrical surfaces.

In other embodiments, the respective aperture 578 inner surfaces and pin 572 outer surfaces are non-cylindrical, for example generally elliptical, though other shapes may be practiced. Such non-cylindrical shapes prevent the pins 572 from rotating within the apertures 578 through interaction of the aperture 578 inner surfaces with the pin 572 outer surfaces, as will be appreciated by one skilled the art (the pin surfaces on major cross-sectional diameters that are greater than the minor cross-sectional diameters of the aperture 578 inner wall surfaces will not be able to rotate into or through said minor cross-sectional diameter areas of the aperture 578 inner wall surfaces). Again, the differences between corresponding portions of at least one of the respective major and minor diameters of the pin and aperture inner wall surfaces may be small enough to form a friction fit between the pins 572 and apertures 578 and thereby hold them in place.

Alternatively, the differences between the diameters of the inner surfaces of cylindrical apertures 578 and pins 572 may be large enough to allow the pins 572 to rotate within the apertures 578. For example, providing for a range between about two to about four thousands of an inch difference may allow the interface between the respective cylindrical surfaces to provide journal bearing or bushing functions, wherein a graphite coating or other lubricant may be applied to one or the other or both of the respective cylindrical surfaces, obviating the need for a bushing between the apertures 578 and pins 572 as discussed above.

The pins 572 may be formed from solid or tubing stock that is drawn and hardened, with hardened and highly polished outer surfaces, and wherein the apertures 578 may have a softer interior cylindrical surface body more readily accepting of a lubricant in the rotating pin assemblies. In some embodiments, there is a ten (10) point differential in hardness between the outer pin 572 surface and the interior aperture 578 surface, allowing the aperture 578 interior surface to engage the hardened pin 572 surface while also retaining lubrication more readily than the hardened surfaces of the pins 572, thus providing bushing-like lubrication functions.

Relative Radii and Pitch Dimension Variations

In another aspect, sun and ring gears necessarily have divergent radii and pitch dimensions, as the sun gear has a much smaller radius and pitch due to its location encompassed by the surrounding, larger ring, typically both aligned with respect to a common central axis. Thus, in one aspect, solving for the pitch and radius of one of the sun and ring gears may often fail to provide an appropriate involute or otherwise an optimal tooth shape for engagement with the other. Accordingly, some conventional sprocket-and-roller gear planetary gear sets typically utilize different planetary gears to engage each of the sun and ring gears, which allows for differences in involute shape and/or teeth radii/pitches for the respective sun and ring gear planets. In contrast, some embodiments of the present invention teach a system and method for roller and sprocket planetary structures wherein the sun gear rollers may have a different diameter relative to the ring gear rollers, yet wherein one planetary sprocket gear form and array (as defined by the sprocket radius and the sprocket tooth pitch) is selected to engage both of the ring and sun gears with an involute tooth shape selected to optimize interaction with both of the divergent sun and ring gear roller diameters. In some embodiments, sun gear rollers may have a larger diameter relative to the ring gear rollers, thereby providing enhancing operative strength of the sun gear relative to the ring gears, in some examples equivalent to or even exceeding the strength of the ring gears. Thus, the present invention enables better load balancing between the ring and sun gear sprocket interfaces, in some embodiments enabling the capacity of the resultant gear set to be increased to that of the (conventionally stronger) ring gear.

Figure 5:
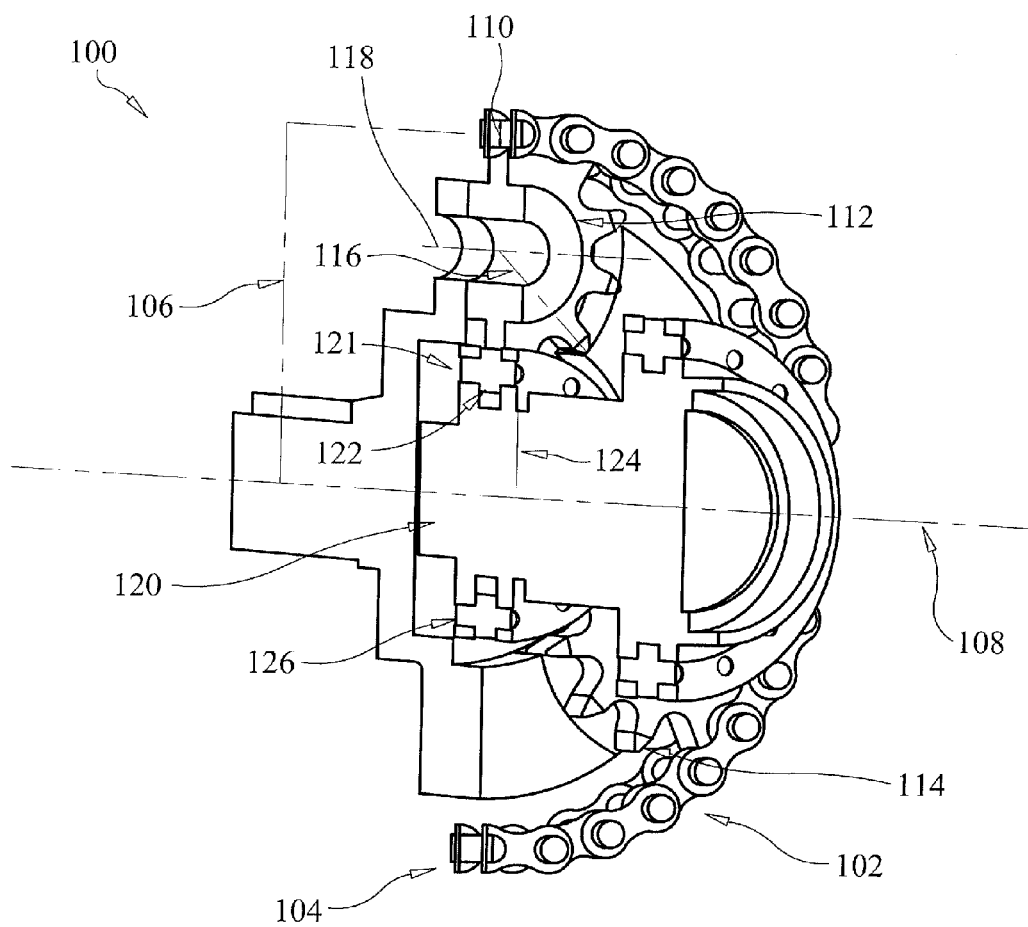
FIG. 5 is a perspective, sectional view illustration of another embodiment of a gearing system according to the present invention.

More particularly, FIG. 5 illustrates a perspective sectional view of a portion of a planetary gearing system 100 according to the present invention. For clarity of illustration, some elements of system 100 are omitted, such as bearings, input and output housings and elements, etc., but the application of such omitted elements will be readily apparent to one skilled in the art. A roller chain ring gear 102 comprises a first plurality of rollers 104 arrayed in a ring gear pitch on a ring gear radius 106 from a central axis 108, each of the first plurality of rollers having a common first roller diameter 110. In the present embodiment, the ring gear pitch is 36, meaning a total of 36 ring gear rollers are arrayed about the central axis 108 along the ring gear radius 106. Three planetary sprockets 112 are encompassed by the ring gear 102, each comprising a plurality of sprocket teeth 114 arrayed outward along a sprocket radius 116 from a central sprocket axis 118 in a sprocket tooth pitch and having a common involute gear shape. In the present embodiment, the sprocket tooth pitch is 12. The planetary sprockets are positioned for the sprocket teeth 114 to engage the ring gear rollers 104. A sun driver 120 is encompassed by the ring gear 102 and comprises a second plurality of rollers 122 disposed rotatably upon roller pins 121 and arrayed in a sun gear pitch less than the ring gear pitch, and on a sun gear radius 124 from the central axis 108 less than the ring gear radius. In the present embodiment, the sun gear pitch is 16. Each of the sun gear rollers 122 have a common second roller diameter 126 different from the ring gear roller diameter 110, the sun gear rollers 122 also positioned to engage the sprocket teeth 114.

The sprocket teeth 114 have a common involute gear shape, the shape and the sprocket tooth pitch selected to optimize a conjugate engagement of both of the ring gear rollers 104 and the sun gear rollers 122 as a function of the ring gear pitch, the sun gear pitch, the ring gear common roller diameter 110 and the sun gear common roller diameter 126. The planetary sprockets 112 are thereby configured to drive an output one of the sun gear 120 and the ring gear 102 at an output speed and torque about the central axis 108 different from an input speed and torque about the central axis 108 of an input other one of the sun gear 120 and the ring gear 102.

Gullet-Dominant Variations

Figure 6:
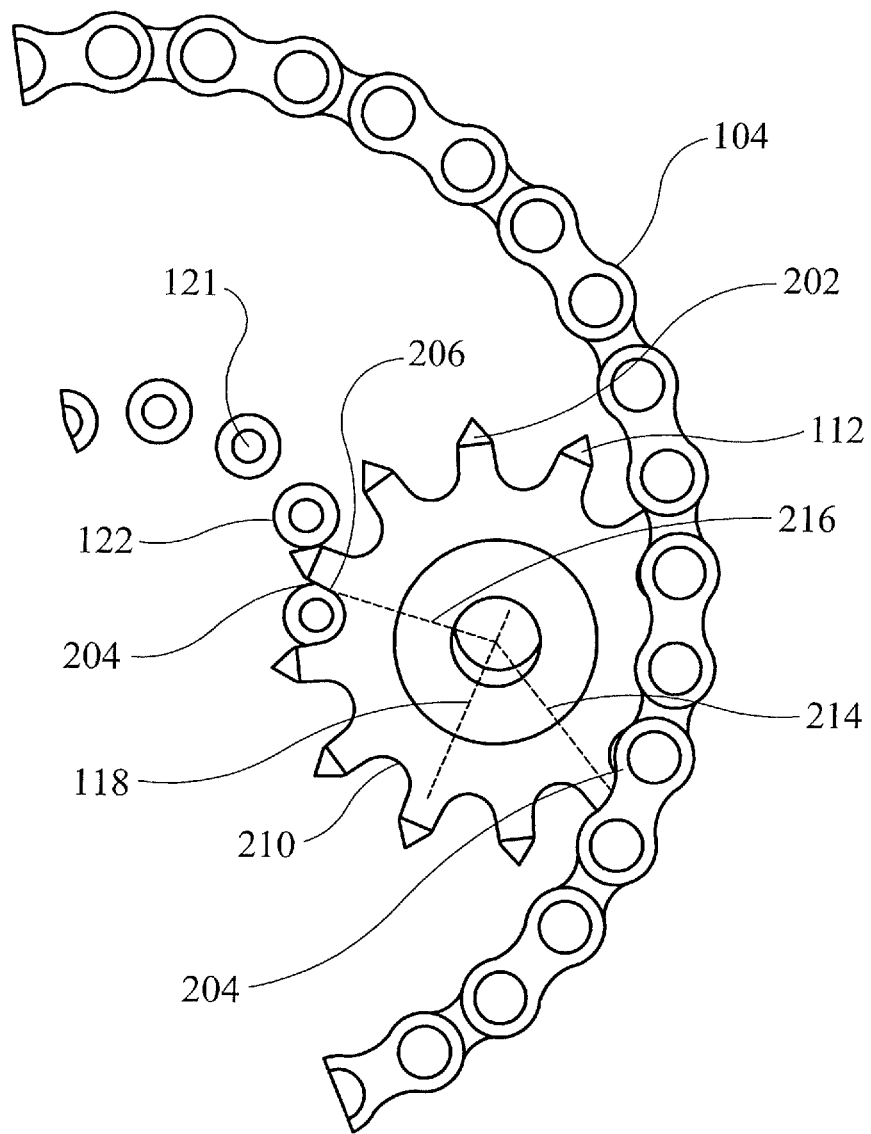
FIG. 6 is a side view illustration of components of the gearing system of FIG. 5.

Referring now to FIG. 6, as well as to FIG. 5, in operation the planetary sprockets 112 are aligned to rotate about their central sprocket axes 118 and with their sprocket teeth 114 drivingly engaging the ring gear rollers 104 substantially at a first roller contact point 204 located along the common involute gear shape 202 and drivingly engaging the sun gear rollers 122 substantially at a second roller contact point 206 located along the common involute gear shape different from the first roller contact point 204. The divergence between the different contact point locations 204 and 206 reflects a deeper penetration into the gullet 210 of the sprocket tooth form 202 of the larger of the sun gear roller 122 and the ring gear roller 104, in one aspect to enable the sprockets 112 to more fully and more forcefully engage said larger diameter roller, and thereby increase the amount of force transferred through said larger roller, relative to the other, smaller roller of the sun gear roller 122 and the ring gear roller 104.

Other embodiments according to the present invention may use different gear forms. It will be understood that either of the sun and ring gear rollers 104/122 may be provided within a roller chain (e.g. 102 of FIGS. 5 and 6), or they may be roller pins rotatably disposed upon pins (e.g. the rollers 122 on the pins 121), on bearings, bushings, lubricants, etc. Alternative planetary systems may also use fixed cylindrical gear teeth arrays, for example the hollow lobe embodiments of the forms 12, 22 discussed above, for either or both of the ring and sun gears 102/120 and thus in substitution of the respective sun and ring gear rollers 104/122. Some exemplary appropriate pin and roller ring gears are taught by U.S. Pat. No. 4,077,273 to Osborn, the entire disclosure of which is hereby incorporated. Moreover, the invention may also be practiced within many other types of gearing systems and gear tooth forms, and is not limited solely to the specific embodiments described herein. According to the present invention, otherwise conventionally disparate gear, sprocket, roller chain and pin gear elements may be chosen or built to function together in a conjugate manner and thereby perform required speed reduction, torque transmission or other power and speed transmission functions.

Some prior art, conventional gear set design assumes (or solves for) a minimum number of roller gears fully seated in the planetary sprocket gullets 210. However, according to the present invention, when the ring gear 102 rollers 104 or lobes 22 have a smaller diameter 110 relative to the sun gear roller 122 or lobes 12 diameters, this is not always the case. As the ratio of the ring gear roller/lobe diameter 110 relative to the sun gear roller/lobe diameter 126 decreases, the distance between the respective roller/lobe engagement contact points 204 and 206 for conjugate engagement by the involute tooth form 202 increases. Thus, in the present embodiment, the point of contact 206 for the larger sun gear roller 122/lobe 12 is closer to the sprocket axis 118 (located on a smaller radius 216 there from) than the point of contact 204 for the smaller ring gear roller 104/lobe 22, which is located on a larger radius 214 from the sprocket axis 118. This enables the larger sun gear roller 122/lobe 12 to be seated more completely within the tooth form gullet 210, which enables enhanced force engagement and transfer with respect to the fewer (sixteen) sun gear rollers 122/lobes 12 relative to the smaller yet more numerous (thirty-six) ring gear rollers 104/lobes 22.

In some embodiments, an amount of sprocket tooth 114 engagement by the ring gear rollers 104 or lobes 22 during load transfer may decrease (the radius/distance 214 of the contact point 204 from the sprocket axis 118 increasing), and the load contact change to a dynamic line contact between the planetary sprockets 112 and roller chain ring gear 102. Thus, according to some embodiments of the present invention, the planetary sprockets involute shapes 202 are selected with a tooth form adaptable for such a line contact interaction with the ring gear rollers 104 or lobes 22. The present invention, thus, also provides a method to design a sprocket tooth involute appropriate for line contact engagement between the planetary sprocket tooth ring gear rollers or tooth form lobes throughout a period of engagement, in one aspect minimizing the amplitude of load fluctuations and impact damage between the parts and thereby maximizing life and performance of the mechanical system as a whole.

Figure 7:
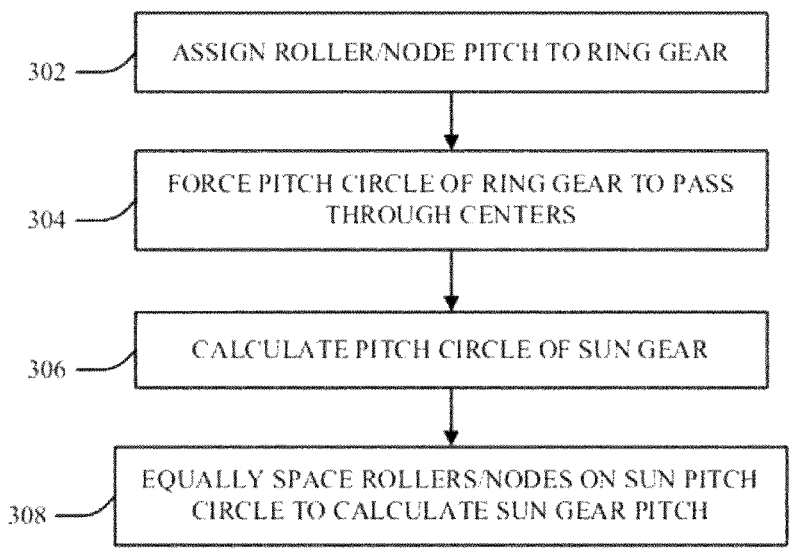
FIG. 7 is a block diagram illustration of a process or method for generating a gearing system according to the present invention.

FIG. 7 illustrates a method or process for defining a gullet-dominant planetary sprocket involute tooth form for engaging roller/cylindrical ring and sun gear tooth forms according to the present invention. The method/process comprises at 302 assigning a roller/cylindrical node pitch to a ring gear; at 304, forcing the pitch circle of the ring gear to pass through the centers of it's rollers/nodes; at 306, calculating a pitch circle of a roller/cylindrical node sun gear as a function of an involute engagement of the ring gear pitch and tooth form geometries; and at 308, equally spacing the rollers/cylindrical nodes on the pitch circle of the sun to calculate the roller/node pitch of the sun gear. In some embodiments, the sun and ring gears have rollers or generally cylindrical nodes of equal diameter, enabling deriving of involute sprocket tooth forms that provide for meshing with the sun and ring gears, and in particular the roller/node ring gear forms meshing perfectly with planetary sprocket gullets. However, though generally such derived planetary tooth forms may mesh perfectly in the sun gear engagement, with operative clearance provided with the ring gear, some degree of clearance interference with the interaction of the ring roller/node and the planetary involute tooth tip generally occurs.

In variations of the process of FIG. 7, the roller/node diameters may be varied relative to each other, for example providing modified rollers of a larger diameter on the ring gear (or reducing the roller/node diameter on the sun), and with the toothed planetary profiles cut for a gullet dominant sun gear interaction. This variation may provide an operational clearance between two adjacent ring rollers/nodes that is similar to that found in the sun engagement, resulting in a better mesh to minimize clearance. The roller/node pitch on the sun may also be specified as less than the pitch on the ring. In one example of a roller/node diameter variation, a ring roller/node was chosen to define the sprocket gullet and having a roller/node diameter on the ring greater than that of rollers/nodes on the sun (even though the sprocket tooth form was defined by the sun roller/node). Results from said diameter variation model indicate that although the clearance interference between the ring roller/node and the sprocket tooth tip was greatly reduced, said clearance interference is still not eliminated, and there was also no apparent (or significant) increase in the contact ratio with the ring. Furthermore, using a larger roller/node on the ring and a smaller roller/node on the sun means that if the contact ratio on the sun is not high enough, the sun roller/node will slip down into the wider gullet, thereby resulting in an imperfect mesh, which may indicate away from using the present diameter variation model.

Dual Profile Tooth Form

In another variation of the gullet-dominant tooth form process of FIG. 7, a dual profile tooth form is created by first using the same technique to calculate the chain pitch on the sun so that all the pitch circles pass through the roller/node centers. Then, one planetary profile is generated based on the sun roller/node and formed on one side of the tooth, and a different, second planetary profile is generated based on the ring roller/node and formed on the other side of the tooth, and wherein the composite gearing assembly is driven in only one direction to ensure correct respective gearing interactions, the design thereby enabling each different profile to create a perfect mesh with each of their respective mating sun and ring roller/nodes. Testing of exemplary models of the dual profile variation demonstrates perfect mesh on the driving side of the tooth profiles as expected. However, once a roller/node disengages, it must exit the gullet and clear the adjacent tooth. Since the sun profile is narrower than the ring profile in the dual-profile tooth, the ring roller has no problem in clearing the adjacent tooth; however, there is interference between the sun roller and the adjacent tooth, which may not be corrected for by modifying the tooth profile where roller forms are used for the ring and sun gears (as the result would eliminate the perfect mesh with the ring).

However, in some sun gear embodiments utilizing solid node lobe designs, it is possible to modify the lobe so that it is slightly out of round in order to both provide a perfect mesh with the driving gear and an adequate mesh in the reverse direction (i.e., clearing the tooth or otherwise resulting in only a slight amount of interference in leaving the gullet). For example, an out of round tooth form may be defined in a generally elliptical form with a plurality of diameter or radii dimensions (minor and major diameters, or one or more radii may be defined from an outer surface location for removing outer diameter material in a chamfer technique, and still other geometric definitions may be practiced).

Figure 8:
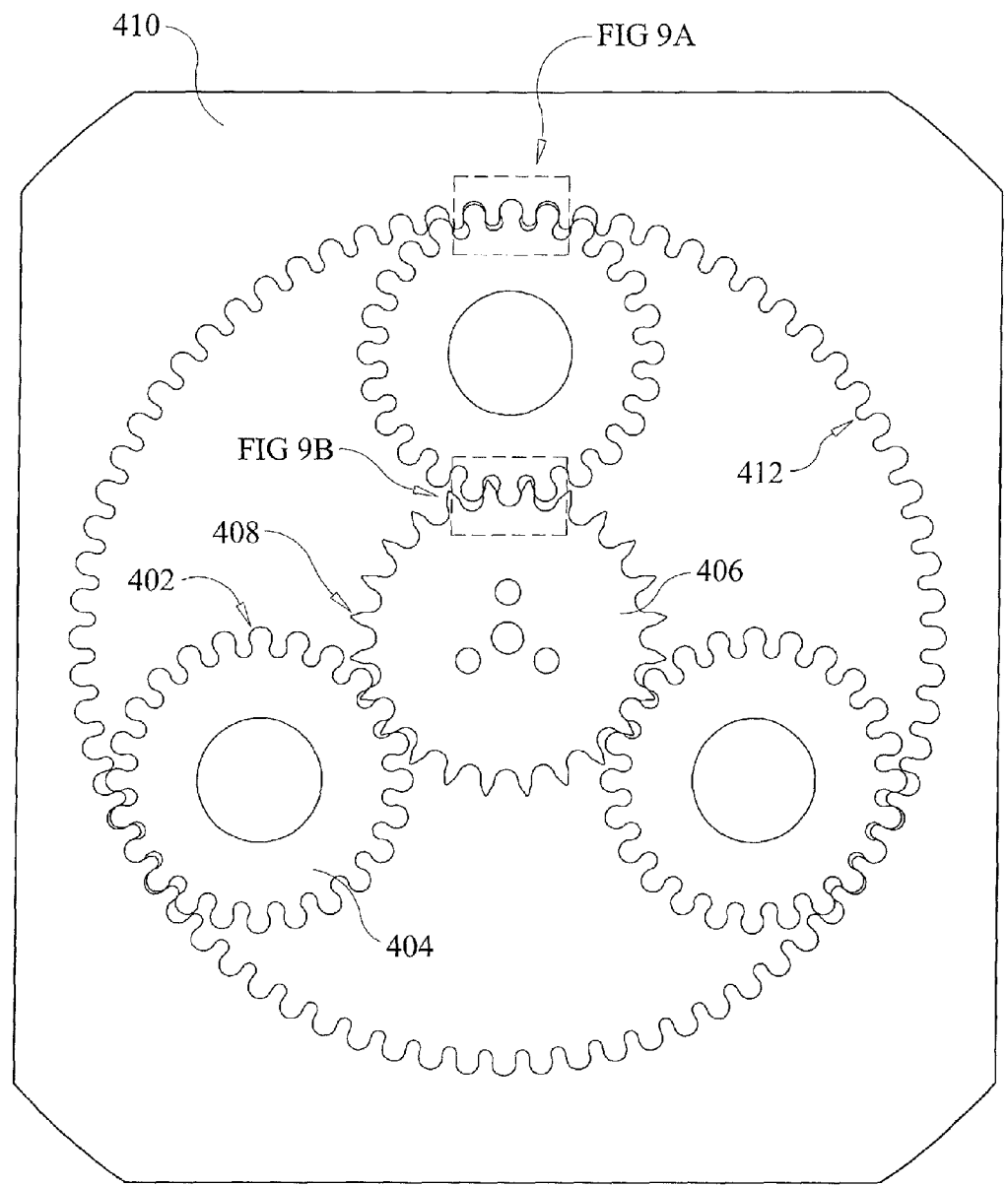
FIG. 8 is a side view illustration of a gearing system according to the present invention.

FIG. 8 illustrates another embodiment of the present invention which provides for a roller/node tooth form 402 on the planetary sprockets 404. In formation and definition of the respective gear forms, a planetary pitch circle is drawn through the planetary roller/node 402 centers and used to calculate independently the pitch circle of the sun gear 406 gear forms 408 (in one embodiment, involute tooth forms 408) and the ring gear 410 tooth forms 412 (in one embodiment, roller/node tooth forms 412), and wherein the resulting pitch circles are used to create the planetary 404 bolt circle. The planetary roller/node tooth forms 402 may provide a perfect mesh with both of similar or different sun and ring tooth forms 408 and 412: each of the sun and ring gear tooth forms 408 and 412 may be separately and independently defined to mesh perfectly with the planetary roller/nodes 402, to smoothly enter into and out of full gullet engagement therewith, and without clearance interference from the tips of their respective tooth or roller/node forms. Embodiments of the present invention thus avoid the problems inherent in the prior art in solving instead for a planetary involute tooth that meshes perfectly with the respective pitches and forms of the different ring and sun gears: no compromise in planetary tooth form is required to avoid interference clearance issues in the ring interaction, the problem instead addressed by variations in the ring gear, leaving the sun gear definition independent and unchanged and thereby maintaining its defined perfect mesh engagement. It will be understood that other embodiments of the present invention may use roller or node forms on the sun gear 406, and/or involute forms on the ring gear 410, in solving for a perfect meshing of either with the planetary gear node/rollers 402.

Figure 9A:
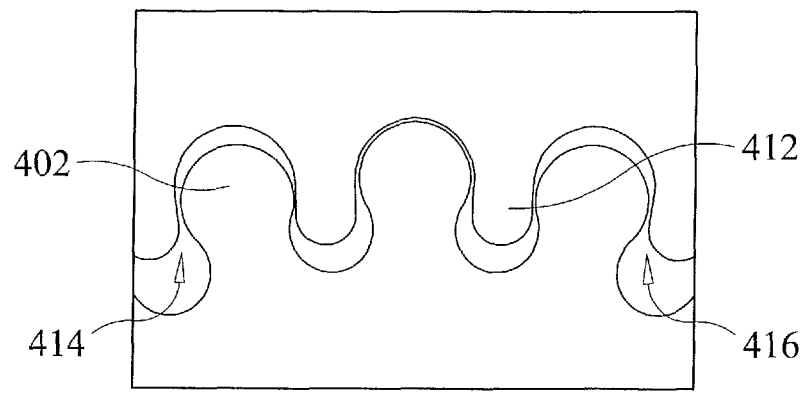
FIGS. 9A and 9B are detailed views of the gearing system of FIG. 8.
Figure 9B:
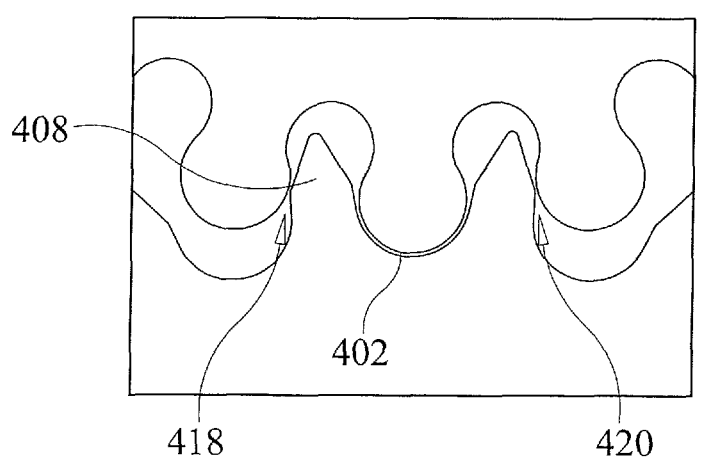

FIGS. 9A and 9B are detail views of the interactions of the planetary roller/node form 402 with the generally cylindrical tooth forms 412 of the ring gear 410, and with the sun involute tooth forms 408, respectively. FIG. 9A illustrates clearance spacing between the sides of the planetary roller/node 402 and the ring tooth form 412 while both entering the gullets in a driving mesh at 414, and in leaving the enmeshed alignment at 416. The geometric parameters, including gullet lengths, of the ring tooth form 412 are solved as a function of the geometric parameters of the planetary roller or nodes 402 as discussed above, and without having to account for the geometric parameters of (or the planetary gear form 402 meshing interactions with) the sun gear 406 or its tooth forms 408.

Similarly, FIG. 9B illustrates clearance spacing between the sides of the planetary roller/node 402 and the sun tooth form 408 while both entering the gullets in a driving mesh at 418, and in leaving the enmeshed alignment at 420. The geometric parameters, including gullet lengths, of the sun tooth forms 408 are solved as a function of the geometric parameters of the planetary roller or nodes 402 as discussed above, and without having to account for the geometric parameters of (or the planetary gear form 402 meshing interactions with) the ring gear 410 or its tooth forms 412.

Programmable Device Implementation

Figure 10:
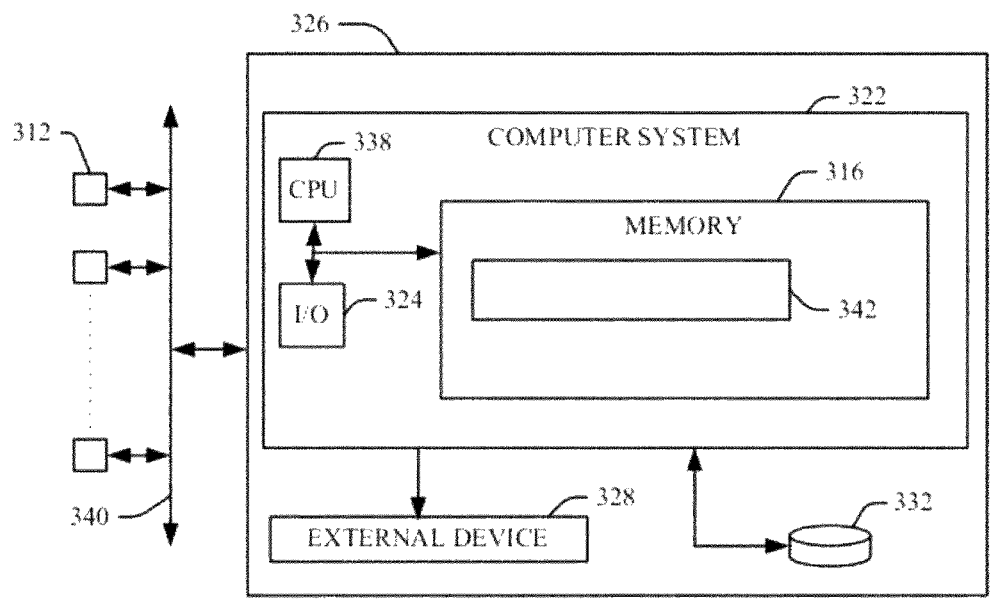
FIG. 10 is a diagrammatic illustration of a computerized implementation of an embodiment of the present invention.

Referring now to FIG. 10, an exemplary computerized implementation of an embodiment of the present invention includes client computer or other programmable device 322 in communication with one or more network servers 312, storage devices 332 or external devices 328, each of which may include third party servers accessible through an SSL or other secure web interface 340, for example in response to computer readable code 342 residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external Input/Output (I/O) devices/resources 324, external devices 328 and storage systems 332. In general, the processing unit 338 may execute computer program code 342, such as code to implement components that define the tooth forms and gearing described above. Said computer program code 342 may be stored in the memory 316, the storage device 332 and/or the external device 328.

Some embodiments perform process steps of the invention on a subscription, advertising, and/or fee basis. That is, a service provider could offer to create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles according to the present invention as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A planetary gearing system, comprising:
a ring gear comprising a plurality of generally cylindrical or elliptical tooth forms arrayed in a ring gear pitch on a ring gear radius from a central axis, each of the ring gear tooth forms having common ring gear shape and geometric parameters;
at least one planetary gear encompassed by the ring gear and comprising a plurality of tooth forms arrayed outward along a planetary gear radius from a central planetary gear axis in a planetary gear tooth pitch and having a common tooth form gear shape and geometric parameters, the at least one planetary gear positioned for the planetary gear tooth forms to operatively engage the ring gear tooth forms in a mesh; and
a sun driver encompassed by the ring gear and comprising a plurality of tooth forms arrayed in a sun gear pitch less than the ring gear pitch and a sun gear radius from the central axis that is less than the ring gear radius, each of the sun gear tooth forms having a common sun gear tooth form shape and geometric parameters and positioned to operatively engage the planetary gear tooth forms in a mesh;
wherein the sun gear tooth form shape and geometric parameters are defined to form the mesh engagement with the at least one planetary gear tooth forms when aligned for engagement at a sun gear contact radius from the central axis as a function of the planetary gear generally cylindrical or elliptical tooth form shape and geometric parameters, the planetary gear radius and the planetary gear tooth pitch; and
wherein the ring gear generally cylindrical or elliptical tooth form shape and geometric parameters are defined to form the mesh engagement with the at least one planetary gear tooth form when aligned for engagement at a ring gear contact radius from the central axis as a function of the planetary gear tooth form shape and geometric parameters, the planetary gear radius and the planetary gear tooth pitch.

2. The system of claim 1, wherein the defined sun gear tooth forms are generally involute sprocket teeth and the sun gear contact radius is selected for a conjugate engagement of the sun gear sprocket teeth by generally cylindrical or elliptical planetary gear tooth forms.

3. The system of claim 2, wherein the sun gear mesh is a shallow engagement mesh, and the sun gear contact radius is a shallow engagement contact radius that is greater than a conjugate contact radius defined by the sun gear tooth forms relative to the central axis.

4. The system of claim 1, wherein at least one of the planetary gear tooth forms and the ring gear tooth forms are solid hollow lobes having a generally cylindrical or elliptical hardened outer surface defined on a cross-sectional diameter and a central aperture defined therein.

5. The system of claim 4, wherein the planetary gear tooth form is a slightly out of round elliptical form defined to provide a mesh in a driven engagement of a one of the sun gear form and the ring gear form, and to define a clearance spacing between tips of the respect tooth forms as they are driven out of the driven engagement.

6. The system of claim 1, wherein at least one of the sun gear form and the ring gear form is a generally cylindrical or elliptical planetary gear tooth form, and wherein the planetary gear tooth form is a sprocket gear comprising a dual-sided involute tooth having:
a first driving-side defined to provide a mesh in a driven engagement of the generally cylindrical or elliptical tooth form of the planetary gear and the sun gear; and
a second disengaging-side opposite the first driving-side that is defined to provide a clearance spacing between tips of the respective tooth forms as they are driven out of the driven engagement.

7. The system of claim 1, wherein the sun gear form and the ring gear form are generally cylindrical or elliptical planetary gear tooth forms; and
wherein the planetary gear tooth form is a sprocket gear with involute tooth forms aligned to rotate about a central sprocket axis and to drivingly engage the ring gear generally cylindrical or elliptical gear forms substantially at a first roller contact point located along an outer surface of the involute gear tooth, and to drivingly engage the generally cylindrical or elliptical sun gear tooth forms substantially at a second contact point located along the outer surface of the involute gear tooth that is different from the first roller contact point; and
wherein a difference between the first and second contact point locations provides a deeper penetration into a gullet of the sprocket tooth form by a larger of the sun gear and ring gear generally cylindrical or elliptical tooth forms.

8. The system of claim 7, wherein the deeper penetration into the gullet of the sprocket tooth form by the larger of the sun gear and ring gear generally cylindrical or elliptical tooth forms provides a more full and more forceful engagement with said larger tooth form relative to an engagement with the other, smaller of the sun gear and ring gear tooth forms.

9. The system of claim 1, wherein the ring gear comprises:
a plurality of pins each having a common outer generally cylindrical or elliptical surface that is defined along at least one outer surface diameter; and
opposing plate portions of a ring gear body which each define generally cylindrical or elliptical apertures defined along at least one inner aperture surface diameter that is greater than the at least one outer surface diameter of the pins and is selected to correspond to the at least one outer surface diameter of the pins to engage the ends of the pins to thereby form a composite ring gear structure with the pins.

10. The system of claim 9, wherein the inner aperture surface forms a friction fit with the outer generally cylindrical or elliptical surface of the pins and thereby holds them in a fixed position within the opposing plate portions of the ring gear body place during engagement with the planetary gear forms.

11. The system of claim 10, wherein the inner aperture surface and the outer pin surface are elliptical forms defined by respective major and minor cross-sectional ellipse diameters; and
the pin surfaces on the major cross-sectional diameters are greater than the minor cross-sectional diameters of the aperture inner wall surfaces.

12. The system of claim 9, wherein the inner aperture surface and the outer pin surface are cylindrical forms defined by respective cylindrical diameters; and
a difference between the diameters of the inner surfaces of cylindrical apertures and the outer surfaces of the pins is large enough to allow the pins to rotate within the apertures during engagement with the planetary gear forms.

13. A method for forming planetary gearing, comprising:
providing a planetary gear comprising a plurality of tooth forms arrayed outward along a planetary gear radius from a central planetary gear axis in a planetary gear tooth pitch and having a common tooth form gear shape and geometric parameters;
defining via a computer processor a ring gear comprising a plurality of generally cylindrical or elliptical surface tooth forms arrayed in a ring gear pitch on a ring gear radius from a central axis, each of the ring gear tooth forms having common ring gear shape and tooth form geometric parameters and forming a mesh engagement with at least one of the provided planetary gears operatively disposed within the ring gear radius and aligned for engagement at a ring gear contact radius from the central axis, the defining the ring gear a function of the planetary gear tooth form shape and geometric parameters, the planetary gear radius and the planetary gear tooth pitch; and
defining via the computer processor a sun driver comprising a plurality of tooth forms having a common sun gear tooth form shape and geometric parameters to operatively engage the at least one planetary gear generally cylindrical tooth form in a mesh when positioned and arrayed in a sun gear pitch less than the ring gear pitch and a sun gear radius from the central axis that is less than the ring gear radius, the defining the sun gear a function of the planetary gear generally tooth form shape and geometric parameters, the planetary gear radius and the planetary gear tooth pitch.

14. The method of claim 13, further comprising:
disposing the at least one planetary gear within the ring gear and into the mesh engagement with the ring gear; and
disposing the sun gear within the ring gear and into the mesh engagement with the at least one planetary gear; and
wherein the sun gear, the at least one planetary gear and the ring gear are aligned to operatively drive their respective mesh engaged gears in response to an input rotation of one of the ring gear and the sun gear about the central axis at an input speed and at an input torque, and to thereby drive an other of the ring gear and the sun gear at an output speed and an output torque about the central axis, and wherein:

the output speed is higher than the input speed and the output torque is lower than the input torque; or the output speed is lower than the input speed and the output torque is higher than the input torque.

15. A computer program product for forming planetary gearing, the computer program product comprising:

a computer readable storage medium;

first program instructions to define a ring gear comprising a plurality of generally cylindrical or elliptical surface tooth forms arrayed in a ring gear pitch on a ring gear radius from a central axis, each of the ring gear tooth forms having common ring gear shape and tooth form geometric parameters and forming a mesh engagement with a plurality of tooth forms of at least one planetary gear operatively disposed within the ring gear radius and aligned for engagement at a ring gear contact radius from the central axis, the planetary gear tooth forms arrayed outward along a planetary gear radius from a central planetary gear axis in a planetary gear tooth pitch and having a common tooth form gear shape and geometric parameters, the defining the ring gear a function of the planetary gear tooth form shape and geometric parameters, the planetary gear radius and the planetary gear tooth pitch; and second program instructions to define a sun driver comprising a plurality of tooth forms having a common sun gear tooth form shape and geometric parameters to operatively engage the at least one planetary gear tooth form in a mesh when positioned and arrayed in a sun gear pitch less than the ring gear pitch and a sun gear radius from the central axis less than the ring gear radius, the defining the sun gear a function of the planetary gear tooth form shape and geometric parameters, the planetary gear radius and the planetary gear tooth pitch; and wherein the first and second program instructions are stored on the computer readable storage medium.

16. The computer program product of claim 15, wherein the first program instructions are to define the ring gear tooth forms as generally cylindrical tooth forms; and wherein the second program instructions are to define the sun gear tooth forms as generally involute sprocket teeth.

17. The computer program product of claim 16, wherein the first program instructions are to define the ring gear generally cylindrical tooth forms as slightly out of round elliptical forms providing a mesh to operatively drive mesh engaged gear tooth forms on the planetary gear, the elliptical forms further defining a clearance spacing between tips of the elliptical forms and the mesh engaged planetary gear tooth forms as they are driven out of their driven engagement.

* * * * *